US006799220B1

(12) United States Patent
Merritt et al.

(10) Patent No.: US 6,799,220 B1
(45) Date of Patent: Sep. 28, 2004

(54) TUNNELING MANAGEMENT MESSAGES OVER A CHANNEL ARCHITECTURE NETWORK

(75) Inventors: Anne Marie Merritt, Beaverton, OR (US); William H. Swortwood, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/549,069

(22) Filed: Apr. 13, 2000

(51) Int. Cl.[7] .............................................. G06F 15/16
(52) U.S. Cl. ...................... 709/238; 709/205; 713/201
(58) Field of Search ......................... 713/201; 711/206, 711/170; 710/30, 33, 56; 709/216, 238, 224, 250; 707/8

(56) References Cited

U.S. PATENT DOCUMENTS

| | | | | |
|---|---|---|---|---|
| 5,968,176 A | * | 10/1999 | Nessett et al. | 713/201 |
| 5,991,797 A | * | 11/1999 | Futral et al. | 709/216 |
| 6,044,415 A | * | 3/2000 | Futral et al. | 710/33 |
| 6,101,549 A | * | 8/2000 | Baugher et al. | 709/238 |
| 6,163,834 A | * | 12/2000 | Garcia et al. | 711/206 |
| 6,347,337 B1 | * | 2/2002 | Shah et al. | 709/224 |
| 6,360,220 B1 | * | 3/2002 | Forin | 707/8 |
| 6,421,769 B1 | * | 7/2002 | Teitenberg et al. | 711/170 |
| 6,529,972 B1 | * | 3/2003 | Coffman | 710/56 |
| 6,542,941 B1 | * | 4/2003 | Simpson, III | 710/30 |

OTHER PUBLICATIONS

Dittia et al., "The APIC Approach to High Performance Network Interface Design: Protected DMA and Other Techniques", In Proceeding of IEEE Infocom, 1997.*
Dunning et al., "The Virtual Interface Architecture", Micro, IEEE, Volumn: 18 Issue:2, Mar./Apr. 1998, pp. 66–76.*
"rfc1577", M. Laubach, Hewlett–Packard Laboratories, Jan. 1994 (http://www.cis.ohio–state.edu/htbin/rfc/rfc1577.html).

* cited by examiner

Primary Examiner—John Follansbee
Assistant Examiner—Jungwon Chang
(74) Attorney, Agent, or Firm—Edward Brake

(57) ABSTRACT

A technique for sending a legacy message over a channel architecture network to a remote legacy device is provided. A host node identifies address information for a legacy object that is located on or within a subnetwork that is beyond the channel architecture network. The address information may include a subnetwork ID to identify the subnetwork and a MAC address of the object within the subnetwork, for example. The host node segments a legacy message (such as management message or SNMP message) into one or more message segments. Each segment is encapsulated in a cell including the address information for the legacy object. A channel adapter in the host node transmits each cell to a channel adapter at a remote I/O node. The I/O node includes a proxy agent that reassembles the legacy message and the sends the reassembled message to the legacy object over a legacy transport (e.g., using protocols and cell formats native to or compatible with the second network).

10 Claims, 10 Drawing Sheets

TUNNELING MANAGEMENT MESSAGES OVER A CHANNEL ARCHITECTURE NETWORK

FIELD

The invention generally relates to computers and computer networks and in particular to a technique for tunneling management messages over a channel architecture network.

BACKGROUND

Several legacy transports have been used as standards for many years. The centralized in-kernel protocol processing for data transfers performed by legacy transports, such as the Transmission Control Protocol/Internet Protocol (TCP/IP) prohibits applications from realizing the potential raw hardware performance offered by underlying high-speed networks. A standard architecture has been proposed for an interface between high performance network hardware and computer systems, and is described in Virtual Interface (VI) Architecture Specification, Version 1.0, Dec. 16, 1997, jointly authored by Compaq Corp., Intel Corp. and Microsoft Corp. The VI Architecture was designed to eliminate the buffer copies and kernel overhead associated with such legacy transports.

While some new or proposed networks may provide improved performance, one or more aspects of such networks may be incompatible with existing or legacy networks or controllers. Users have already invested large sums of money in legacy equipment and controllers. As a result, there is a need to allow for the continued operation and maintenance of the legacy equipment while being connected to such an incompatible network.

BRIEF DESCRIPTION OF THE DRAWINGS

The foregoing and a better understanding of the present invention will become apparent from the following detailed description of exemplary embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and is not limited thereto. The spirit and scope of the present invention is limited only by the terms of the appended claims.

The following represents brief descriptions of the drawings, wherein.

DETAILED DESCRIPTION

A technique is provided for sending a legacy message (such as a management message or a SNMP message) over a channel architecture network to a remote legacy object. The legacy object may be located on or within a subnetwork that is beyond the channel architecture network. A host node identifies address information for the legacy object. The address information may include a subnetwork ID to identify the subnetwork and a MAC address of the object within the subnetwork, for example. The host node segments the legacy message into one or more message segments. Each segment is encapsulated in a cell including the address information for the legacy object and is transmitted over the channel architecture network to an I/O node. The I/O node reassembles the legacy message and then transmits or forwards the reassembled legacy message over a legacy transport to the legacy object based on the address information.

I. The VI Architecture

Figure 1A:
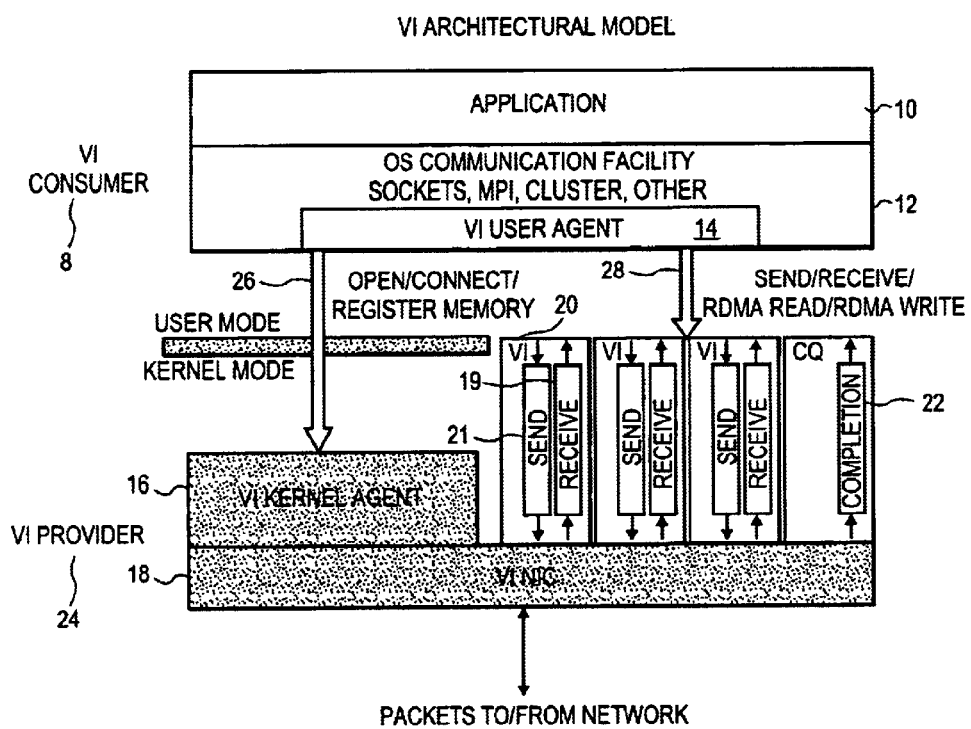
FIG. 1A is a block diagram illustrating a Virtual Interface (VI) architectural model.

In a traditional transport, communication operations or data transfers result in buffer copies being made at multiple levels or layers, mode switches and context switches, which can be computationally expensive to execute. The VI architecture was designed to eliminate buffer copies and kernel overhead for communication that have caused traditional networked applications to be performance bottlenecks in the past. FIG. 1A is a block diagram illustrating the VI Architectural model. The VI architecture is a user-level networking architecture designed to achieve low latency, high bandwidth communication within a cluster. VI architecture avoids intermediate data copies and bypasses the operating system to achieve low latency, high bandwidth data transfers.

As shown in FIG. 1A, the VI architectural model includes a VI consumer 8 is and a VI provider 24. A VI consumer 8 is a software process that communicates using a Virtual Interface (VI). The VI consumer 8 typically includes an application program 10, an operating system communications facility 12 (e.g., Sockets) and a VI user agent 14. The VI provider 24 includes the combination of a VI network interface controller (VI NIC) 18 and a VI kernel agent 16.

Figure 1B:
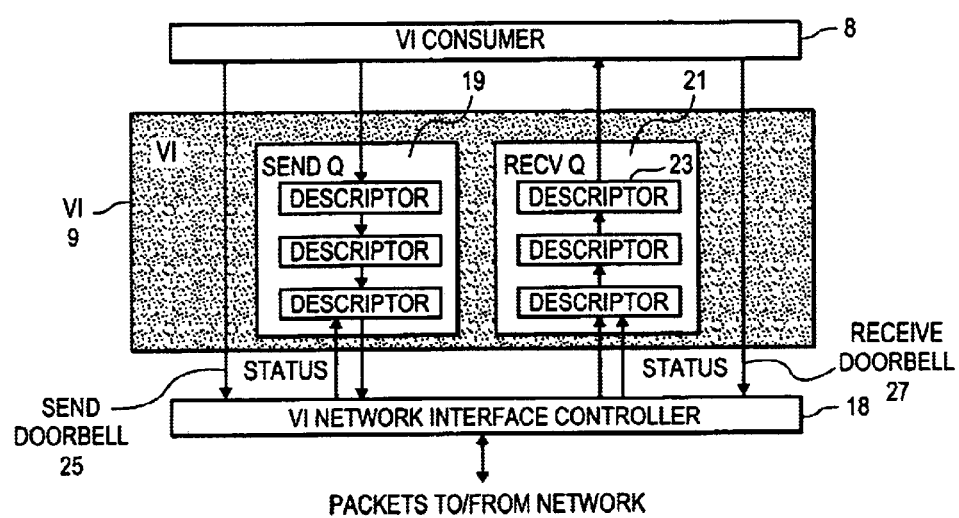
FIG. 1B is a block diagram illustrating a Virtual Interface.

A block diagram illustrating a virtual interface (VI) is illustrated in FIG. 1B. Referring to FIGS. 1A and 1B, a virtual interface (VI) 9 is an interface between a VI NIC 18 and a process or application (a VI consumer 8). The VI 9 allows a VI NIC 18 to directly access the process' (or application's) memory for data transfer operations between the application and the network (i.e., data transfers directly between the application memory and the network without passing through the operating system). The VI 9 includes a pair of work queues, one for send operations (a send queue 21) and one for receive operations (receive queue 19). The work queues store one or more descriptors 23 between the time it is Posted (placed in the queue) and the time it is Done (when the VI NIC has completed processing it). The descriptor 23 is a data structure recognizable by the VI NIC that describes a data movement request, and it includes a list of segments (a control segment, an optional address segment and one or more data segments). The control segment identifies the type of VI NIC data movement operation to be performed (e.g., send, receive) and the status of a completed NIC data movement operation. The data segment describes (or provides an address) of an application data buffer for a VI NIC data movement operation. A receive queue 19 contains descriptors that describe where to place incoming data. A send queue 21 contains descriptors that describe the data to be transmitted. A pair of VIs can be associated using connection primitives to allow packets sent at one VI to be received at the other VI. A send doorbell 25 and a receive doorbell 27 are provided for allowing the VI consumer to notify the VI NIC 18 that work (a descriptor describing a requested data transfer operation) has been placed in the send queue 20 and receive queue 19, respectively.

Referring to FIG. 1A again, the VI user agent 14 is a software component that enables an operating system communication facility 12 to use a particular VI provider 24. The VI user agent abstracts the details of the underlying VI NIC hardware in accordance with an interface defined by an operating system communication facility 12. The VI user agent includes a library of primitives that provide functions for creating a VI, for destroying a VI, for connecting one VI to another, to post descriptors (to place a descriptor in a work queue), etc.

The kernel agent 16 is the privileged part of the operating system, usually a driver supplied by the VI NIC vendor, that performs the setup and resource management functions needed to maintain a virtual interface between VI consumers and VI NICs. These functions include the creation/destruction of VIs, VI connection setup/teardown, interrupt management, management of system memory used by the VI NIC and error handling. VI consumers access the kernel agent 16 using the standard operating system mechanisms such as system calls. As shown by arrow 26 (FIG. 1A), the OS communication facility 12 makes system calls to the VI kernel agent 16 to perform several control operations, including to create a VI on the local system, to connect the local VI to a VI on a remote system (if connection-oriented transfer is desired), and to register application memory. Memory registration enables the VI provider (or VI NIC) to transfer data directly between the registered buffers of a VI consumer and the network (without passing through the OS kernel). Traditional network transports often copy data between user buffers and one or more intermediate kernel buffers. Thus, processing overhead is decreased in the VI architecture because data transfers are performed by the NIC by moving data directly between the registered application buffers and the network without making intermediate kernel copies and without making system calls to the OS kernel.

After creating a VI on the local system of host, connecting the local VI to a remote VI (if a connection oriented data transfer is desired), and registering memory, application 10 or operating system communication facility 12 can use data transfer primitives of VI user agent 14 to send and receive data. The VI architecture defines two types of data transfer operations: 1) traditional send/receive operations; and 2) Remote DMA (RDMA) read/write operations. Once a connection is established (if a connection is desired), the OS communication facility can post the application's send and receive requests directly to the local VI (to the send and receive queues). A consumer 8 posts descriptors (e.g., places descriptors in a work queue) then rings a doorbell to notify the NIC that work has been placed in the work queue. The VI consumer can ring the doorbell (notify the VI NIC 18 of the work in the queue) without kernel processing. The VI NIC 18 then processes the descriptor by sending or receiving data (directly between application memory and network without kernel processing), and may then notify the VI consumer 8 of the completed work using the completion queue 22. VI architecture does not provide for transport level services, including segmentation and reassembly, flow control, buffer management, etc.

II. Overview of the Channel Architecture Network

According to an embodiment of the invention, a channel architecture network is provided that is based upon or similar to the Virtual Interface (VI) Architecture. As such, the channel architecture network of the present invention includes many of the features and advantages of the VI architecture. According to an embodiment of the channel architecture network, a pair of work queues (i.e., a send queue and a receive queue) are provided at each node of the channel architecture network. The work queues allow for direct data transfers between the node's registered memory regions (or buffers) and the network without system calls to the OS kernel and without making kernel buffer copies, as described above regarding the VI architecture. Memory regions/buffers can include volatile and nonvolatile memory, storage devices, I/O devices, network attached devices, etc.

Figure 2:
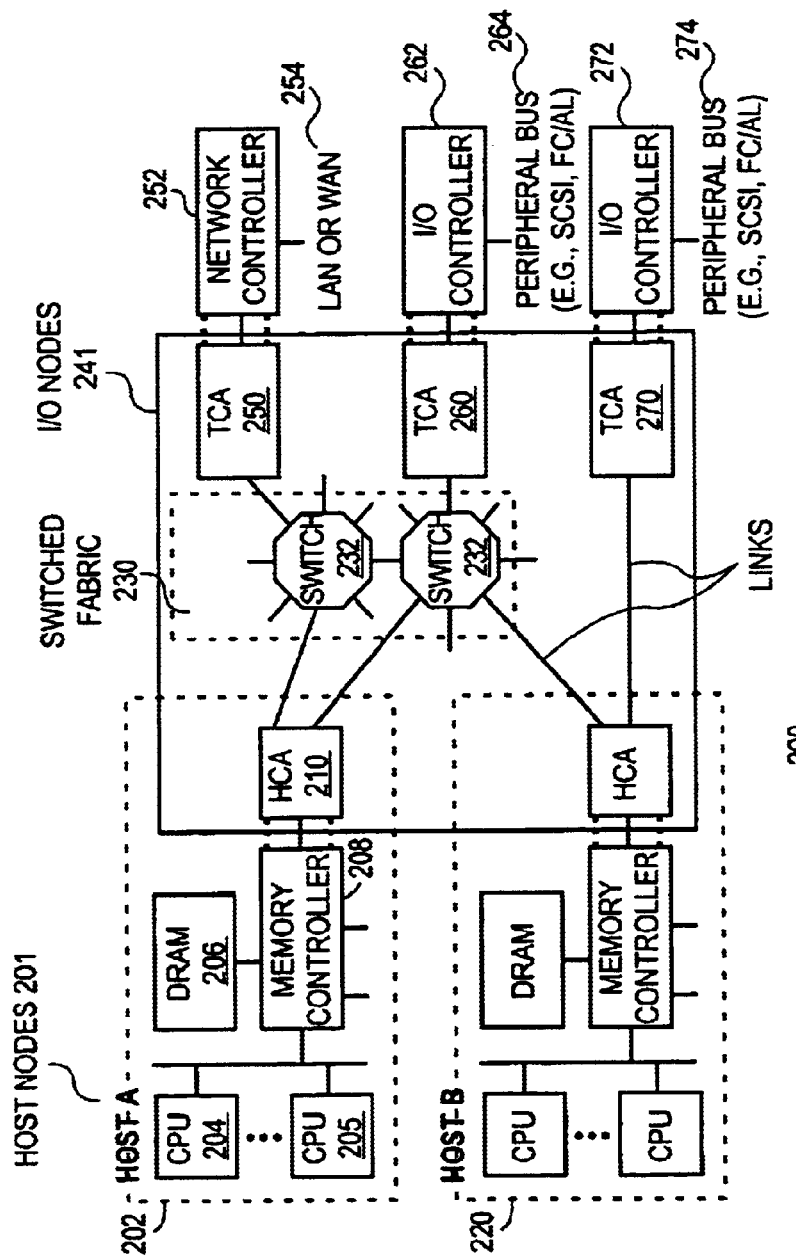
FIG. 2 is a block diagram illustrating an example channel architecture network according to an example embodiment.

FIG. 2 is a block diagram illustrating an example channel architecture network according to an example embodiment. According to an embodiment, the channel architecture network 200 includes one or more host nodes 201 and typically one or more input/output (I/O) nodes 241 coupled together over a switched fabric 230. The switched fabric 230 includes one or more switches (e.g., switches 232 and 234 shown in FIG. 2).

The switches, host nodes and I/O nodes are coupled together via one or more physical links. According to an embodiment, a physical link may be a point to point physical media connection, which is bidirectional and that carries data and control between two ports on adjacent communicating modules or nodes. A channel provides a path between two communicating host nodes 201 and/or I/O nodes 241 that allows control and data to flow. Each channel is bidirectional and can send and receive packets. Both send/receive and RDMA data transfer operations are supported, similar to VI Architecture. A physical link supports one or more channels. A channel does not require a dedicated set of physical links.

An I/O node 241 is a node attached to the switched fabric 230 that services I/O requests (e.g., including storage devices, network devices, I/O devices). A host node 201 is a computer on which a variety of software or programs run, including an operating system (OS), OS communications facilities, application programs. One or more programs running or executing on a host node (such as a device driver or application program) may initiate a request for I/O services, which will be serviced by an I/O node.

The host node 202 may include, for example, a processor (or CPU) 204, memory 206 (such as Dynamic Random Access Memory or DRAM) and a memory controller 208, a computer display, pointing devices (e.g., mouse and keyboard) and other components typically provided as part of a computer or server. Host node 220 includes similar components. Although not shown, each I/O node 241 may also include a processor, memory, a memory controller, a display, pointing devices and other components typically provided as part of a computer.

According to an embodiment, a channel adapter is connected to each of the host nodes 201 and I/O nodes 241 (or a channel adapter is provided as part of the node). A channel adapter includes the logic and/or control that allows nodes to communicate with each other over a channel (or over the switched fabric 230 within the channel architecture network 200). Each channel adapter includes one or more ports, with each port typically having a unique address (e.g., a unique media access control or MAC address). According to an example embodiment, there are two types of channel adapters, including a host channel adapter (HCA) which interfaces to the host node (e.g., interfaces to the memory controller of the host node, for example), and a target channel adapter (TCA) which attaches to or is part of an I/O node. As examples, host node 202 includes a HCA 210. The I/O nodes 241 shown in FIG. 2 include three I/O nodes, including TCAs 250, 260 and 270. TCA 250 is connected to a network controller 252, which is connected to a Local Area Network (LAN) or a Wide Area Network (WAN) 254. One or more networked devices may be connected to the LAN or WAN 254 as well. TCA 260 is connected to an Input/Output (I/O) controller 262 which controls a peripheral bus (such as Small Computer System Interface or SCSI, Fibre Channel, etc.) with one or more I/O devices connected thereto. Similarly, TCA 270 is connected to an I/O controller 272 which controls another peripheral bus 274.

According to an embodiment, one or more applications and other programs (application programs, operating system, I/O device drivers, etc.) running on a host node or an I/O node may operate as a VI consumer, while each connected channel adapter (i.e., HCA or TCA) may operate as a VI NIC 18 (see FIG. 1A).

The term "channel architecture network" generally refers to a network in which data transfers are performed directly between registered buffers or memory regions (e.g., registered application buffers) and the network without making kernel buffer copies, similar to the VI architecture. (An additional copy of the data, however, may be made at the NIC level or by the channel adapter).

Therefore, according to an embodiment, host nodes and I/O nodes each may include a work queue pair, including a send queue and a receive queue (as described above for VI). These queues may take many different forms. According to an example embodiment, the host node (e.g., host application program or host driver) places descriptors into send queues for a send operation (or into receive queues for a receive operation), and then rings a doorbell to notify the HCA that work has been placed in the work queues. The HCA then sends or receives the data over a channel. For example, for a send operation, the HCA generates one or more packets containing the data from the host's registered buffer(s) described by the descriptor as a payload. The one or more packets are then sent over the channel (e.g., over the network 200, including over the switched fabric 230) to the destination node and destination work queue pair.

The behavior of a channel depends on two attributes, the acknowledge and connection attributes. If the acknowledge attribute is set, then a descriptor is not completed until an acknowledgement is returned. When the connected attribute for a channel is set, the two work communicating queue pairs are bound together or associated at either end of the channel. Therefore, all data sent from one send queue is directed to the connected receive queue. If the connected attribute is not set (meaning a connectionless data transfer), then communicating work queue pairs are not bound together, and a node can send/receive packets to/from any work queue pair. In such case, the descriptor may be required to specify the destination (e.g., MAC address and work queue pair number of destination).

III. Tunneling Management Messages Over A Channel Architecture Network

Figure 3:
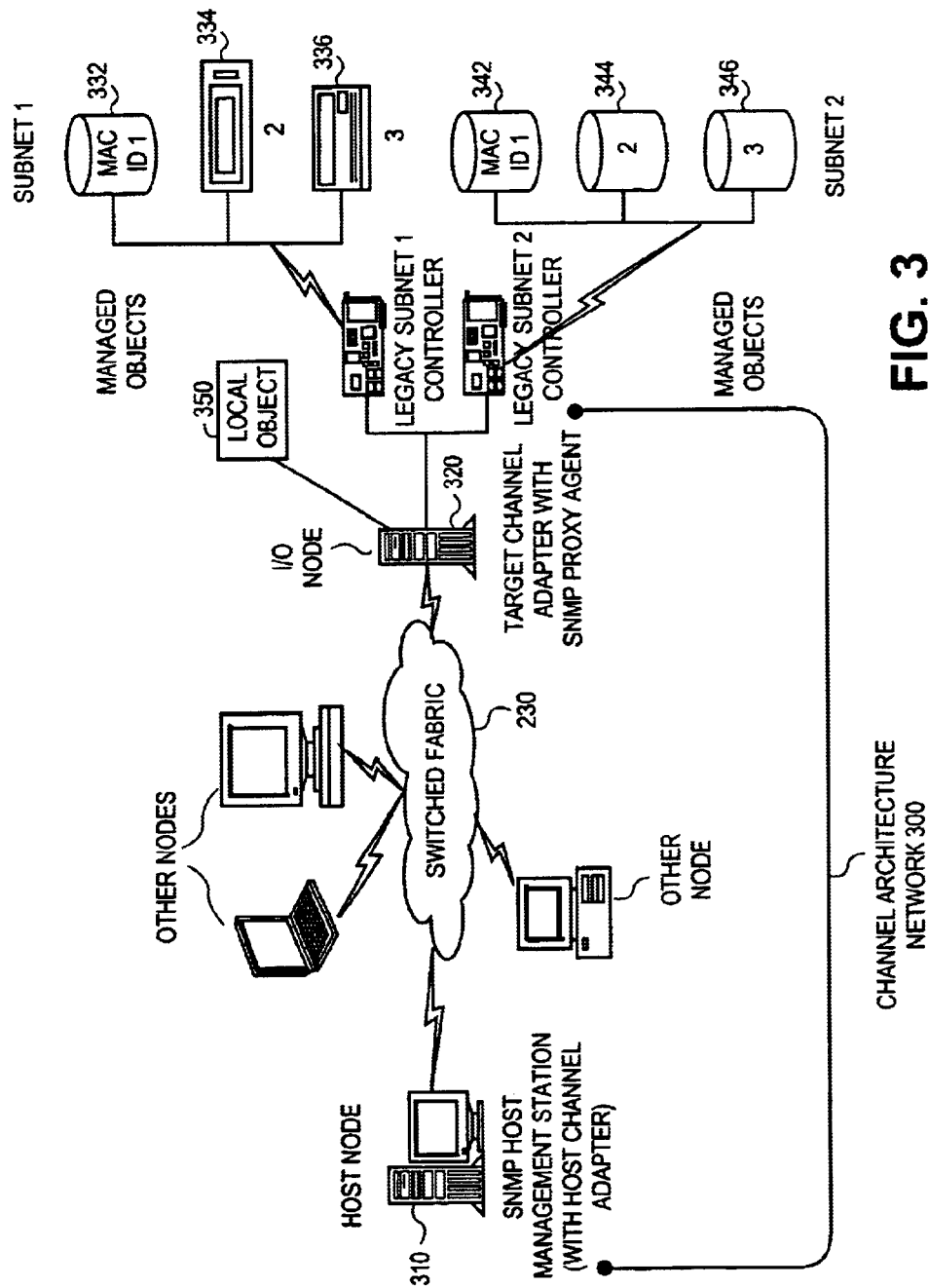
FIG. 3 is a block diagram illustrating channel architecture network according to another example embodiment.

FIG. 3 is a block diagram illustrating channel architecture network 300 according to another example embodiment. The channel architecture network 300 includes a host node 310 with a host channel adapter (HCA) that is connected to a switched fabric 230. An I/O node 320 having a target channel adapter (TCA) is also connected to the switched fabric 230. The channel architecture network 300 also includes several other nodes that are connected to the fabric 230.

In this example network, the I/O node 320 is connected to a local legacy managed object 350, and is also connected to a legacy subnetwork 1 (subnet 1) via a legacy controller 330, and connected to a legacy subnet 2 via a legacy controller 340. Legacy subnet 1 includes several managed objects, including object 332 (having a MAC ID 1 on legacy subnet 1), an object 334 (having MAC ID 2 on legacy subnet 1) and object 336 (having a MAC ID 3 on legacy subnet 1). Legacy subnet 2 includes several managed objects, including object 342 (having a MAC ID 1 on legacy subnet 2), an object 344 (having MAC ID 2 on legacy subnet 2) and object 346 (having a MAC ID 3 on legacy subnet 2). The legacy managed objects may be SCSI devices, Fibre Channel devices, or other types of legacy I/O or storage devices and the like.

In this example, host node 310 includes one or more software programs or control logic that allows node 310 to operate as a Simple Network Management Protocol (SNMP) host management station for monitoring and managing one or more of the legacy objects. As part of the management of one or more legacy objects, the host management station 310 will typically send or receive SNMP management packets to the remotely managed objects.

According to an embodiment, a host node located within the channel architecture network 300 can manage any other node within the channel architecture network 300 (e.g., any node connected to the switched fabric 230) using a Fabric Management Packet (FMP), for example. According to one embodiment, a FMP packet may be sent over the fabric 230 to a managed node within network 300 as a connectionless packet.

However, according to an embodiment, the bounds or end points of the channel architecture network 300 extend only to the I/O node 320. The legacy subnet 1 (including controller 330 and its legacy objects) and legacy subnet 2 (including controller 340 and legacy objects) are outside the channel architecture network 300. Moreover, the channel architecture network 300 includes its own set of management protocols, procedures, cell formats, etc., which are generally incompatible with one or more legacy protocols, such as TCP/IP, SNMP, etc. As a result, FMP management packets (which are native or compatible with the channel architecture network 300) cannot directly be used to manage the legacy objects because the FMP packet cannot be directly transported beyond the end points of the channel architecture network 300 (i.e., beyond I/O node 320). Even if the FMP management packets (which are native to the network 300) could be delivered to the remote legacy objects, the legacy objects would not understand the FMP packets due to incompatibilities in commands, format, etc., between an SNMP message (native to the legacy subnets and objects) and a FMP packet (native to channel architecture network 300). Rather, the legacy objects connected to subnets 1 and 2 should be managed according to the legacy protocols (e.g., TCP/IP, SNMP), packet formats and management procedures which are native to the legacy objects. Therefore, it is desirable to provide a technique to transport the legacy management messages (e.g., SNMP messages) over the channel architecture network 300 to the legacy objects.

According to one embodiment, legacy (e.g., SNMP) management messages could be delivered to the remote legacy objects by providing the legacy protocols or transport (e.g., SNMP, UDP, TCP/IP) on top of the direct memory to network transport provided by the channel architecture network 300. However, this would add significant unnecessary overhead and would nullify many of the advantages of the channel architecture network (e.g., performing data transfers directly from registered memory to the network without making kernel buffer copies). Also, this would require network 300 to provide both the native channel architecture network transport as well as the legacy transport (e.g., TCP/IP, SNMP), resulting in significant increase in cost and complexity of network 300.

According to another embodiment of the invention, another approach can be used in which the legacy management message is tunneled over the channel architecture network and delivered to (or received from) the one or more legacy objects. To perform the tunneling, an SNMP host management station 310 (with a HCA) may segment a SNMP management message and encapsulate each segment in a channel architecture network cell that is transported over the switched fabric 230 to a destination (e.g., to I/O node 320 in this example, which includes a TCA).

Figure 6:
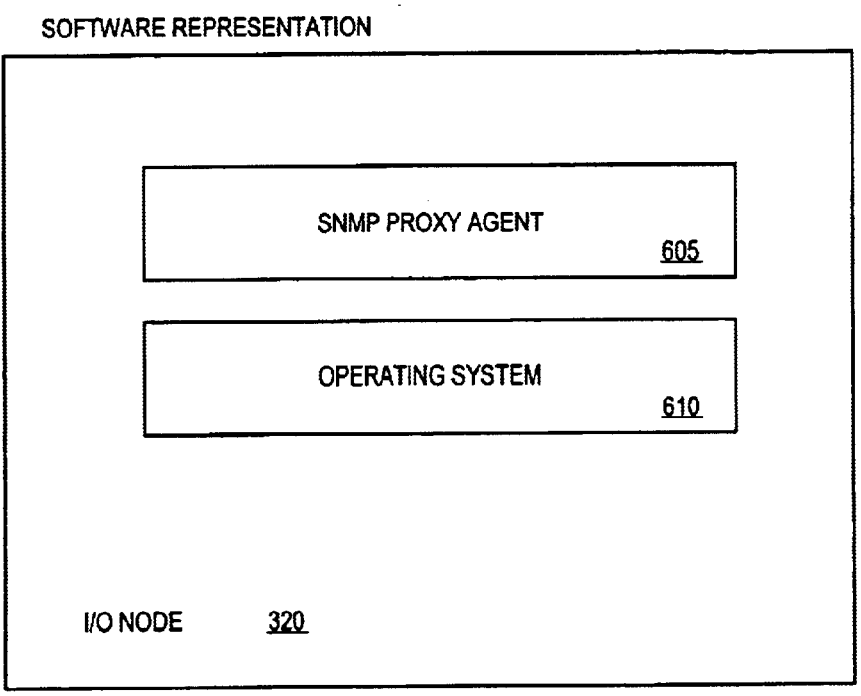
FIG. 6 is a block diagram illustrating some software components of an I/O node according to an example embodiment.
Figure 7:
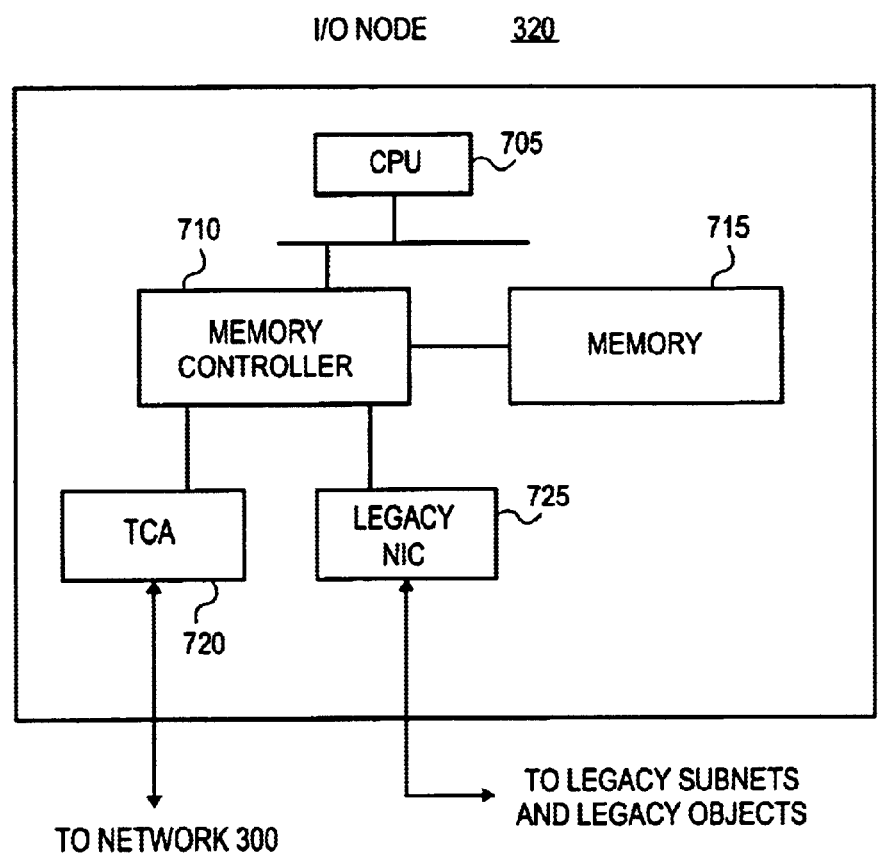
FIG. 7 is a block diagram illustrating some of the hardware of an example I/O node according to an example embodiment.

FIG. 6 is a block diagram illustrating some of the software components of I/O node 320 according to an example embodiment. I/O node 320 includes an operating system 610 and an SNMP proxy agent 605 (or a proxy agent for another legacy management protocol). FIG. 7 is a block diagram illustrating some of the hardware of I/O node 320 according to an example embodiment. The I/O node includes a CPU (or processor) 705, a memory controller 710, a main memory 715 (such as DRAM), a target channel adapter (TCA) 720 and a legacy network interface controller (NIC) 725.

The one or more SNMP segments are received by the TCA 720, and moved by the TCA 720 to registered buffers in the I/O node 320 (e.g., part of main memory 715) based on descriptors in a receive queue. SNMP proxy agent 605, executing or running on CPU 705, reassembles the original SNMP message from the one or more received SNMP segments. The SNMP proxy agent 605 then forwards the reassembled SNMP message via the legacy NIC 725 over a legacy transport or over the legacy subnetwork to the appropriate legacy object.

An example cell format will be described below followed by a more detailed explanation of the process for tunneling legacy management messages (and/or other types of legacy messages) over the channel architecture network 300.

A. Example Cell Formats

Figure 4:
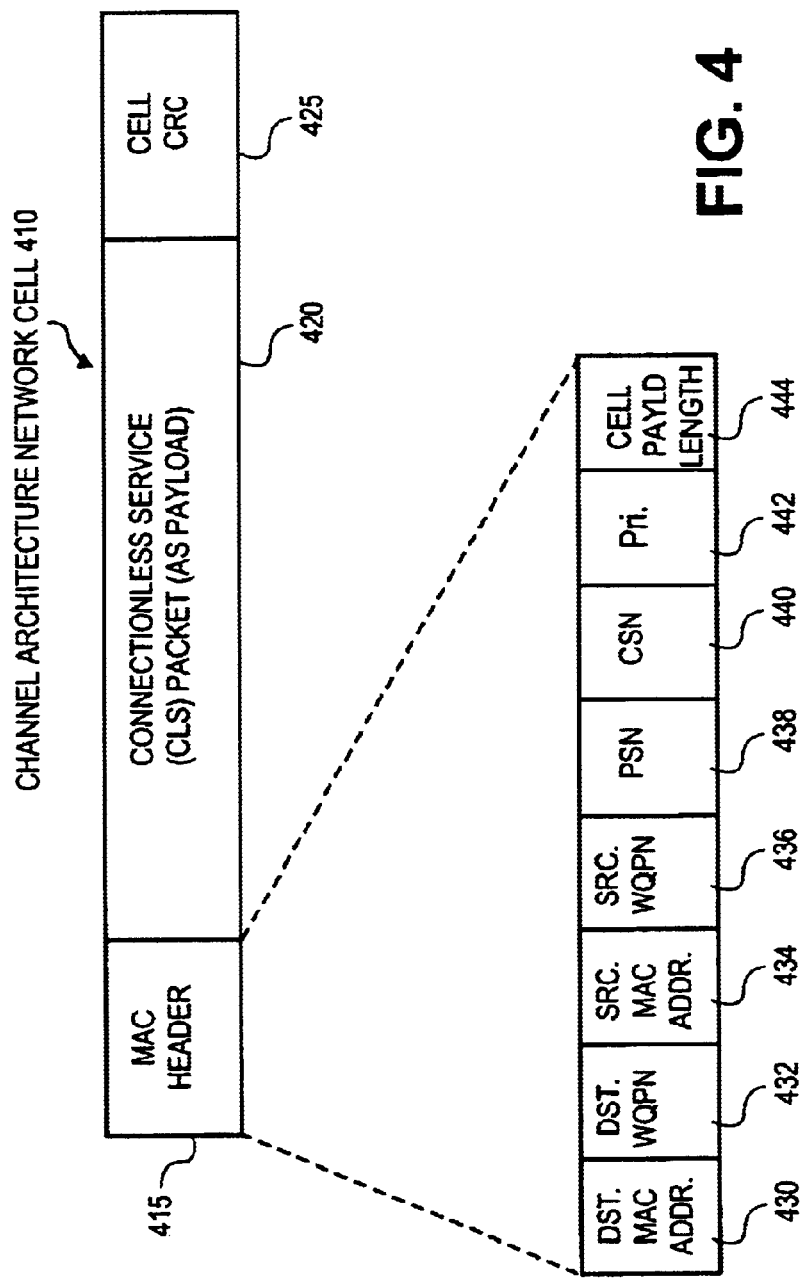
FIG. 4 is a block diagram illustrating a channel architecture network cell according to an example embodiment.

FIG. 4 is a block diagram illustrating a channel architecture network cell 410. Cell 410 includes a header 415, such as a media access control (MAC) header. The cell 410 also includes a payload. In this example cell, the payload is shown as a connectionless service packet 420, although other types of payloads can be used. Thus, the techniques of the invention are not limited to a connectionless packet. The cell 410 also includes a cyclic redundancy check (CRC) 425, which may be calculated over the packet 420 or over both the header 415 and the packet 420.

The header 415 includes several fields, including a destination MAC address 430, a destination work queue pair number 432, a source MAC address 434, a source work queue pair number 436, a packet sequence number 438, a cell sequence number 440, a cell priority 442, and a cell payload length 444. The header 415 may also include many other types of fields not shown.

The destination MAC address 430 identifies the MAC address of the destination I/O node (e.g., the MAC address of the TCA of I/O node 320 in this example). The destination work queue pair number identifies the work queue pair in the destination node (I/O node 320) which includes a send queue and a receive queue. For a cell transmitted from host node 310 to I/O node 320, the destination work queue pair number 432 identifies the send and receive queue to be used at the I/O node to process the received data. Thus, the field 432 specifies which receive queue will contain descriptors to describe where the TCA 720 will place the received data in registered memory of I/O node 320.

The source MAC address 434 is a MAC address of the host node 310. The source work queue pair number 436 identifies the send queue which will contain one or more descriptors that describe the data to be transmitted (e.g., including describing the location of the SNMP message segments to be transmitted).

Figure 5:
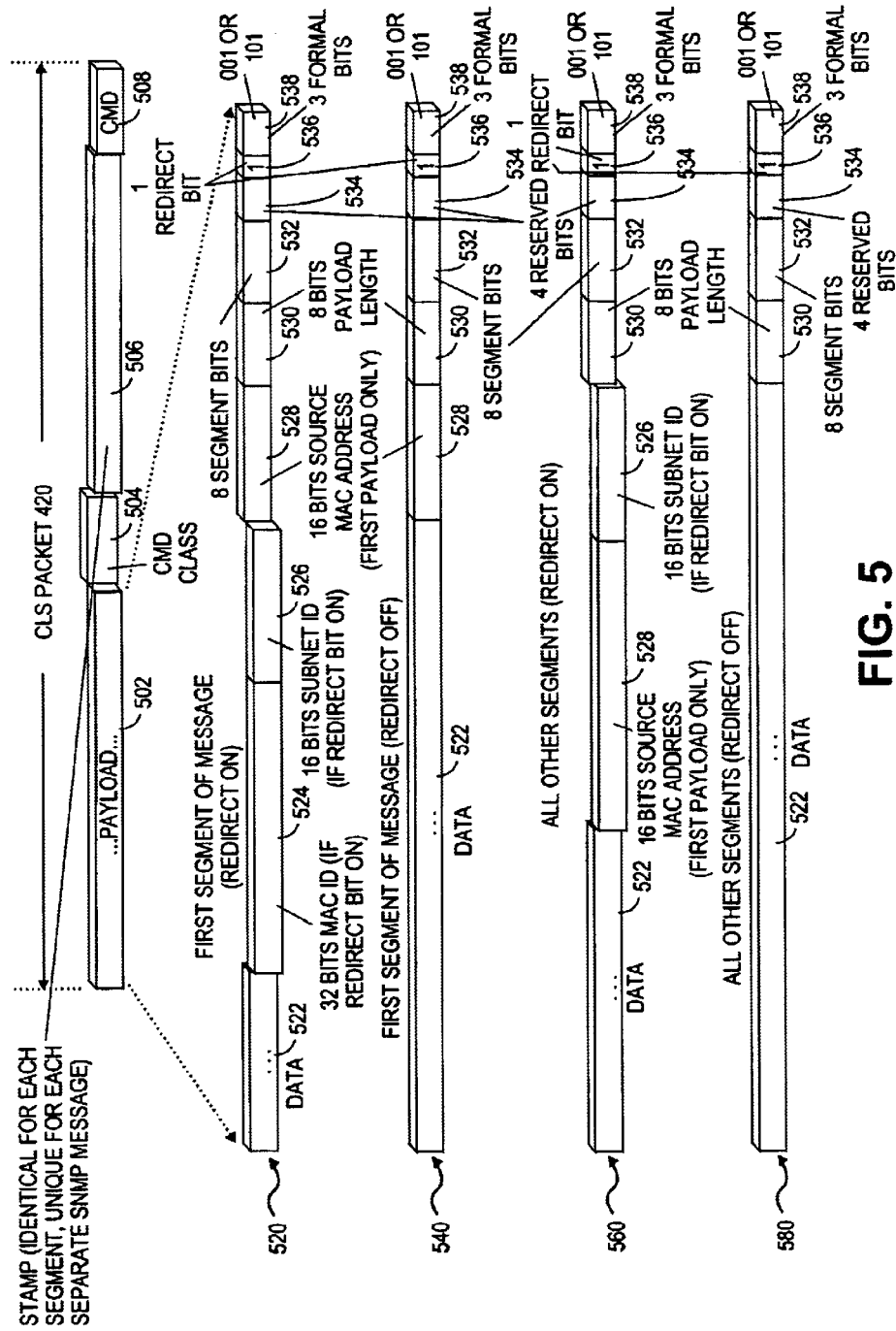
FIG. 5 is a block diagram illustrating different formats for a connectionless service packet of FIG. 4 according to an example embodiment.

FIG. 5 is a block diagram illustrating different formats for a connectionless service packet of FIG. 4 according to an example embodiment. As shown in FIG. 5, the connectionless service (CLS) packet includes a payload 502, a command class field 504, a stamp 506 and a command 508. The payload 502 includes the SNMP message segment and other control information described below. The command class field 504 disambiguates different commands or messages going to the same work queue pair. According to an embodiment, one particular value ("SNMP message") of command class 504 specifies that the CLS packet contains an SNMP message. When a "SNMP message" value for command class field 504 is detected by I/O node 320, this causes the SNMP proxy agent 605 to reassemble the SNMP message and then forward the SNMP message to an addressed or target legacy device.

The stamp 506 is identical for each segment of an SNMP message, and is different for each different SNMP messages. Thus, all SNMP segments provided in CLS packets having the same stamp in stamp field 506 correspond to the same SNMP message. The SNMP segments provided in the CLS payloads having a same stamp will be reassembled by SNMP proxy agent 605 into one legacy management message (e.g., SNMP message).

After a SNMP message is reassembled at the I/O node 320, the SNMP message may be redirected to a legacy device that is connected to (or part of) another network or subnetwork (e.g., redirected to another network or subnetwork). For example, the SNMP message will be redirected to subnetwork 1 if the legacy device to be managed is device 332 (located on subnet 1, FIG. 3), for example. Also, a SNMP management message (after reassembly) will not be redirected if the legacy device to be managed is directly (or locally) attached to the I/O node, such as object 350 for example (FIG. 3). Rather in that case, the SNMP message is directly transmitted to the local object 350 (as an example).

As shown in FIG. 5, the payload 502 of CLS packet 420 can include four different formats depending upon the circumstances. The four formats for payload 502 are shown in FIG. 5, including payloads 520, 540, 560 and 580.

Payload 520 is used in CLS packet 420 for the first segment of a SNMP message when the SNMP message (or other legacy management message) will be redirected to a separate subnetwork. Payload 520 includes data 522 (including the SNMP message segment). A redirect bit 536 indicates whether the data 522 (or SNMP message) will be redirected to another network. For payload 520, the redirect bit 536 is set to 1, indicating that the data will be redirected.

A subnet ID (or address) 526 identifies which of the one or more subnetworks will receive the redirected message or data. A MAC address 524 identifies the address of the destination legacy device within the subnetwork (e.g., MAC address of the legacy device within the subnet 1 to receive the SNMP message). A source MAC address 528 identifies the address of the host node (or the address of the host's HCA) sending the CLS packet 420 over network 300. The source MAC address 528 is provided in the CLS packet 420 only for the first segment of a SNMP message. A payload length 530 indicates the length of the data 522. A segment field identifies the number of the SNMP segment (or CLS packet) for this particular SNMP message (i.e., the order of this CLS packet corresponding to a particular stamp 506). For example, a segment field 532 of 010 may for example that this segment (provided in data field 522) is the third SNMP segment for the SNMP message (all SNMP message segments for a SNMP message will have a common stamp 506). A reserved field 534 is provided for future use.

A format field 538 indicates whether this CLS packet 420 is for the first segment, a middle segment or the last segment. For example, the following format field 538 could be used:

001—first segment
010—more segments (a middle segment)
100—last segment
101—first and last segment (no segmentation).

Since the MAC address and work queue pair number of the destination I/O node are known by the HCA of the sending node and are attached by the HCA (as a MAC header 415, FIG. 4) prior to sending the cell 410 over the wire, there is no need to repeat the MAC address and work queue pair number here of the destination I/O node. However, since the sending host node 310 may be expecting a response from the SNMP proxy agent, the source MAC address (identifying the address of the sending host node 310) is repeated in the field 528 (this MAC address is also provided within MAC header 415, FIG. 4). This source MAC address must be repeated within CLS packet 420 because the TCA 720 (FIG. 7) that receives the channel architecture network cell 410 will strip off the MAC header 415 and cell CRC 425 before passing the enclosed CLS packet 420 (or cell payload) up to higher layers of software (e.g., to SNMP proxy agent 605 at I/O node 320) for processing.

The remaining formats for payload 502 are similar to payload 520, with the following differences. Payload 540 is used in CLS packet 420 for the first segment of a SNMP message when the SNMP will not be redirected to a separate subnetwork (redirect bit 536 is off). Because this message will not be redirected to another network, a subnet ID 26 and a MAC address 524 are not used in payload 540. Also, the redirect bit 536 is cleared to zero for payload 540. A source MAC address 528 is provided in payload 540 because it is for a first segment According to an example embodiment, the SNMP message identifies the object as part of its protocol. Before an object can be managed, a MIB Management Information Base II format (MIB II) describing it is created. The MIB includes of a tree structure that contains the objects referenced by Object Identifiers (OIDs). Then, the SNMP proxy agent populates that MIB. with data. The SNMP Manager station (or host) must load the MIB before it knows how to format a message to it. It uses the MIB in the SNMP message to identify the instance of data (via an object ident OID) its setting or getting—both sides know the object being managed, and uses the SNMP object identification method, which is the MIB, to identify the target object. According to an example embodiment, any managed object residing beyond the TCA/HCA endpoint will have an SNMP agent to receive the message, decode it via the agreed upon MIB, and be able to format a response using the Object Identifier (OID) to reference the data being accessed or changed.

Payload 560 is used in CLS packet 420 for the segments other than the first segment of a SNMP message when the SNMP will be redirected to a separate subnetwork (redirect on). Payload 560 is similar to payload 520, but does not include a source MAC address 528, and has a different value for format field 538. Payload 580 is similar to payload 540 but does not include a source MAC address 528, and has a different value for format field 538.

B. An Example Tunneling Technique

Figure 8:
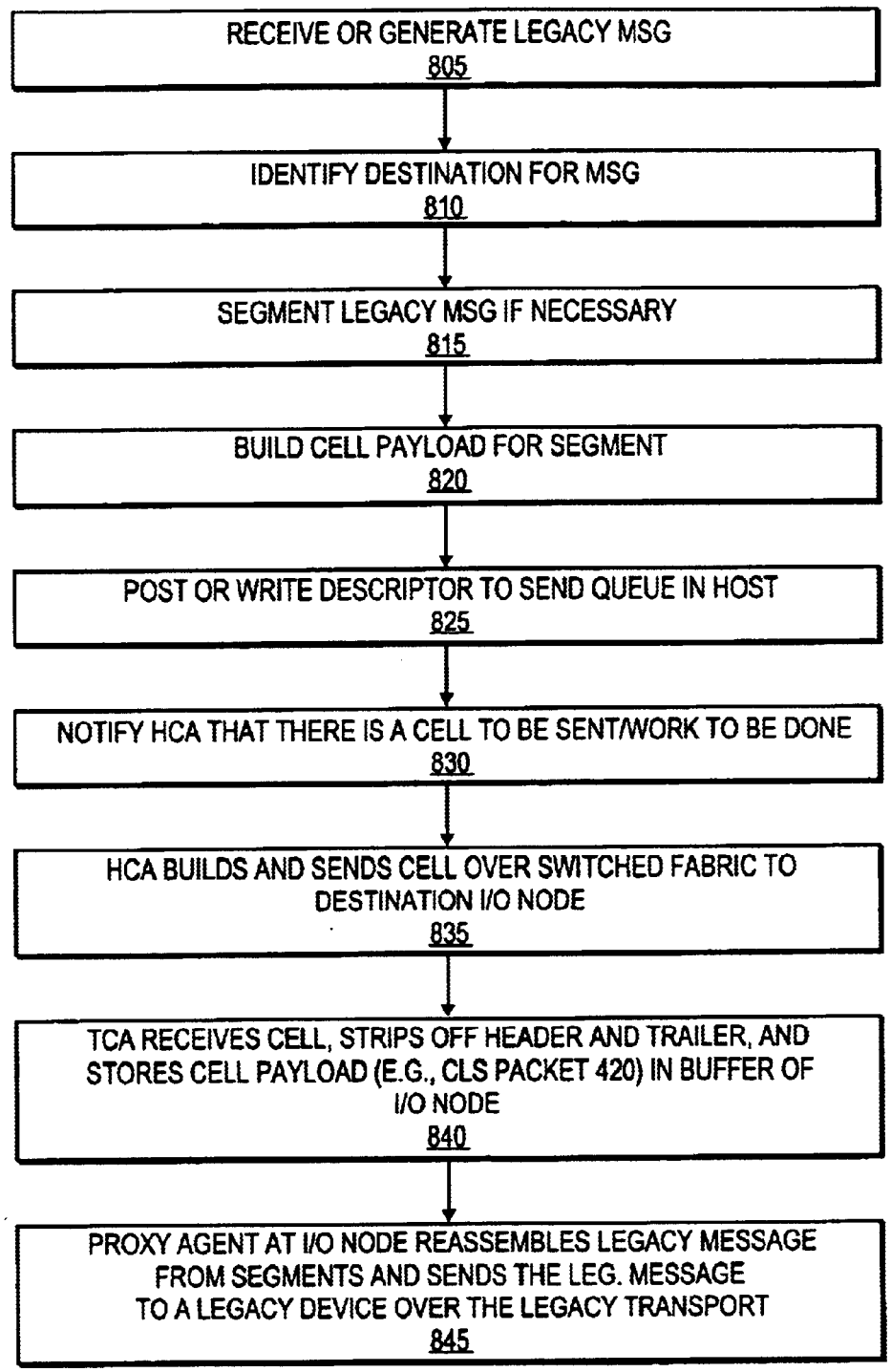
FIG. 8 is a flow chart illustrating an example technique for tunneling a legacy message over a channel architecture network according to example embodiment.
Figure 9:
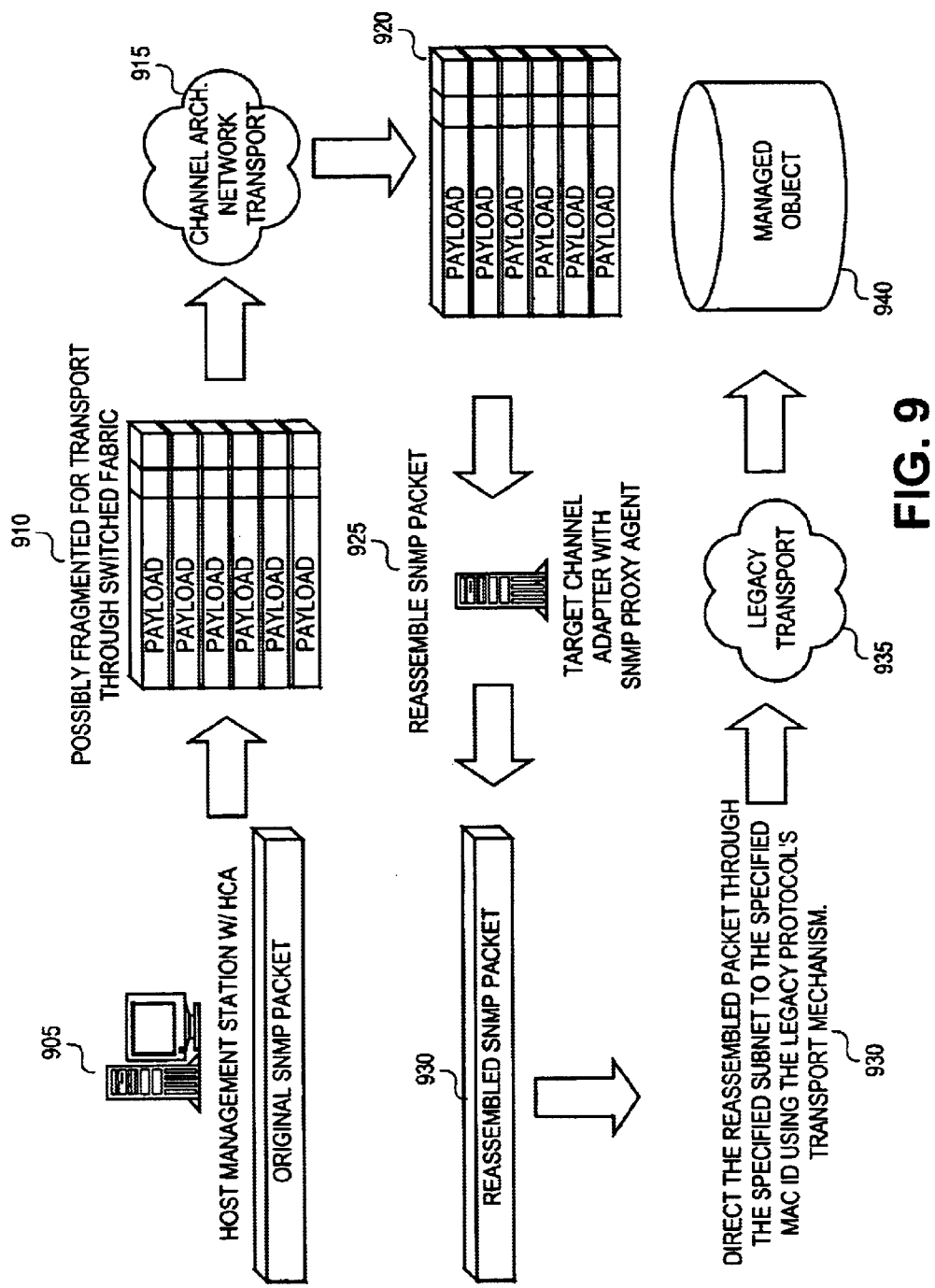
FIG. 9 is a block diagram that illustrates an example technique for tunneling a legacy message over a channel architecture network.

FIG. 8 is a flow chart illustrating an example technique for tunneling a legacy message over a channel architecture network according to example embodiment. FIG. 9 is a block diagram that illustrates the example technique for tunneling a legacy message over a channel architecture network illustrated in FIG. 8. Referring to FIGS. 8 and 9, at block 805, the SNMP host management station (host node) 310 either receives or generates a SNMP message (corresponding to item 905, FIG. 9).

At block 810, the host node 810 identifies a destination (e.g., a destination address) for the SNMP message. This may include, for example, identifying MAC address (field 430, FIG. 4) of the destination I/O node 320 where the target legacy object is coupled, and the work queue pair number (field 432, FIG. 4) at the I/O node to be used to send the messages. If a connection-oriented communication will be used, the work queue pair number will be previously specified through a binding process or a process of associating a pair of work queues at the host with a pair of work queues at the remote I/O node. If a connectionless service packet is used, this information will need to be specified.

Block 810 may also include identifying a subnet ID to identify the remote subnetwork where the legacy object is located, and a MAC address of the legacy object within the subnet (if the message will be redirected). The host node 310 can identify or discover the address information of one or more remote legacy objects using a variety of techniques. For example, the host node 310 may query various nodes connected to the switched fabric 230 (FIG. 3) to obtain a list or map of which nodes are SNMP enabled and a list or map of which subnetworks and legacy objects exist behind each node (including their MAC addresses and subnet IDs). Alternatively, a fabric manager of network 300 may query each node on network 300 to obtain this map and then provide or send this information to each node. The fabric manager may also specify the objects which belong to each host node or which may be managed by each host node, including their subnet IDs and MAC addresses. Other techniques can be used as well.

At block 815, the SNMP host node determines whether the SNMP message exceeds the maximum payload (e.g., maximum size of payload 522) that can be transported or sent in a channel architecture network cell 410 (FIG. 4) over network 300. If the SNMP message cannot be sent in the a single cell 410, the host node then segments the SNMP message. Blocks 820–840 described below are repeated for each segment.

At block 820, the host node builds a cell payload for transmitting the segment. This block involves building a CLS packet 420 (FIG. 5) for the segment in a registered buffer in host memory. Referring to FIG. 5 as well, the SNMP segment is stored in the data field 522. The subnet ID of the subnet where the legacy object is located is stored in field 526 and the MAC address of the legacy object within the subnet is stored in field 524 (if redirect is required). The source MAC address of the host node (or of the HCA) is stored in field 528 (first segment only). The remaining fields within payload 502, including payload length 530, segment number 532, redirect bit 536 and format field 538, are set to the appropriate values as described above. The command class 504 is set to "SNMP Message", and the stamp 506 is set to the same value for all segments of a SNMP message. The command field 508 is not used and can be set to any value for tunneling SNMP messages.

At block 825, a descriptor describing the data to be sent is posted or written to a send queue of the host node. The descriptor may include, for example, the address of the segment buffering that stores the cell payload (including the SNMP segment) to be transmitted, the MAC address of the target or destination I/O node or TCA, the work queue pair number of the destination I/O node (if connectionless transmission). The descriptor will also identify the type of action to be performed ("send" in this case).

At block 830, the host node rings a doorbell to notify the HCA that there is a cell to be transmitted.

At block 835, the HCA in the host node reads the descriptor in the send queue, copies the data from the identified memory buffer into HCA memory, and then builds a channel architecture network cell 410 (FIG. 4), including MAC header 415, a CLS packet 420 and a cell CRC 425. The HCA already knows its own MAC address and work queue pair number to be used (inserted as source MAC address 434 and source work queue pair number 436 in MAC header 415). The destination MAC address 430 and destination work queue pair number 432 can be obtained from the descriptor, for example. The data that was stored in the identified host buffer (including the SNMP segment) is used as the CLS packet 420. The host node can then generate a cell CRC 425 to complete the cell 410 (FIG. 4). Several completed channel architecture network cells 410 (each including an SNMP segment in the payload) are shown at item 910, FIG. 9.

Continuing at block 835 of FIG. 8, the HCA then sends the channel architecture network cell 410 over the network 300 (including the switched fabric 230, FIG. 3) to a destination I/O node 320. The transmission of the cell 410 over the network 300 is generally illustrated at item 915 of FIG. 9.

The address of the destination I/O node 320 is provided in the field 430 of the MAC header 415 of the cell 410. The destination MAC address 430 can be used by the various switches within switched fabric 230 to properly route the cell 410 to the correct destination I/O node 320 (FIG. 3). For example, each switch in switched fabric 230 may include a routing table that identifies an output port for routing the cell based on the destination address (known as MAC address routing). Alternatively, if one or more I/O nodes or switches within network 300 have not yet been configured (e.g., do not yet have a routing table), a directed routing technique can be used where explicit routing instructions are provided within cell 410 on a hop-by-hop basis (e.g., identifying the output port for routing at each switch or hop along a path).

At block 840, the cell 410 arrives at the TCA, and the TCA strips off the header 415 and trailer (or cell CRC) 425. The received cells 410 are shown as item 920 in FIG. 9. The TCA reads the descriptor in the receive queue of the I/O node 320, and then stores the cell payload (e.g., the CLS packet 420) in a registered buffer in the memory of the I/O node 320.

At block 845, the I/O node 320 reads the command class field 504 for each CLS packet 420 stored in memory.

Because the command class is identified as "SNMP message," the SNMP proxy agent 605 (FIG. 6) executing on the I/O node 320 regenerates or reassembles the SNMP message based on the one or more CLS packets.

The SNMP proxy agent 605 then reads the redirect bit for each CLS packet 420. If redirect bit is off (indicating that a local or directly attached legacy object is the destination), the SNMP message is reassembled and directly sent to the local object. If the redirect bit is on, the SNMP proxy agent then reassembles the SNMP message (including the appropriate headers and trailers). The appropriate headers and address fields are added to generate an SNMP packet (or an appropriate legacy packet), using the subnet ID and the MAC address of the legacy object within the subnet. The reassembly of the SNMP packet is shown as item 925 and the reassembled SNMP packet is shown as item 930 in FIG. 9. The reassembled SNMP packet or message is then transmitted or directed (item 930 FIG. 9) over the legacy transport (item 935, FIG. 9) to the managed object 940. The legacy transport may include for, example, use of TCP/IP, UDP and/or SNMP or other legacy protocols to send the SNMP packet to a legacy object that is located on a Local Area Network (LAN) or other type of network.

For example, the SNMP message (or packet) may be transmitted to legacy subnet 1 controller 330 by legacy NIC 725 (FIG. 7) based on the subnet ID. Upon receipt of the SNMP packet, subnet 1 controller 330 then routes the SNMP packet to the appropriate legacy object or device based on the MAC address for the object within the subnet.

Several embodiments of the present invention are specifically illustrated and/or described herein. However, it will be appreciated that modifications and variations of the present invention are covered by the above teachings and within the purview of the appended claims without departing from the spirit and intended scope of the invention. For example, while the invention has been described with reference to the tunneling of management messages (including SNMP messages as an example), the techniques of the invention can be used to tunnel any type of message over a channel architecture network to a legacy device.

What is claimed is:

1. A method of sending a legacy message over a channel architecture network to a remote legacy device comprising:

identifying address information for a legacy object that is located beyond the channel architecture network;

segmenting a legacy message at a first node of a channel architecture network into a plurality of message segments;

performing the following for each legacy message segment:

encapsulating the message segment in a channel architecture network cell, the cell also including the address information for the legacy object; and sending the cell over a channel architecture network to a second node on the channel architecture network;

reassembling the legacy message based upon the plurality of message segments; and forwarding the reassembled legacy message to the legacy device based upon the address information, wherein said encapsulating the message segment comprises building of a cell payload in a registered buffer, said payload including a stamp field to identify all segments belonging to a same legacy message.

2. The method of claim 1 wherein the channel architecture network comprises a network having a plurality of nodes interconnected via a switched fabric, each of the nodes transmitting data over the network by transferring data from registered buffers in memory to the network without making intermediate kernel buffer copies.

3. The method of claim 1 wherein the legacy object is connected to a subnetwork that is connected to the second node, the address information for the legacy object including a subnetwork ID and an address of the legacy object within the subnetwork.

4. The method of claim 1 wherein the legacy message comprises a legacy management message.

5. The method of claim 4 wherein the legacy management message comprises a SNMP message.

6. The method of claim 1 and further comprising:

posting a descriptor in a send queue of the first node, the descriptor describing the cell payload to be sent over the network to the second node; and notifying a channel adapter of the first node that there is data to be sent over the channel architecture network.

7. The method of claim 6 wherein the descriptor identifies:

the address of the buffer storing the cell payload;

an address of the second node as a destination; and an action to be taken on the payload is Send.

8. The method of claim 6 wherein said sending the cell over a channel architecture network to a second node comprises a channel adapter performing the following without intervention of the operating system kernel:

reading the descriptor;

retrieving the cell payload based on the descriptor;

building the cell based on the descriptor, the cell including a MAC header and the cell; and sending the cell over the channel architecture network to the second node.

9. The method of claim 1 wherein the building of a cell payload in a registered buffer further comprises generating the following fields within the payload:

the message segment as a data field;

a subnet ID identifying a subnetwork connected to the second node and an address of the legacy object within the subnetwork;

an address of the first node or source node provided for a cell of at least one of the segments; and a segment number.

10. The method of claim 9 wherein the cell payload further comprises a redirect field that indicates whether the legacy object is local to the second node or is located within another network remote from the second node.

* * * * *